(12) United States Patent
Hagedorn

(10) Patent No.: US 9,062,756 B2
(45) Date of Patent: Jun. 23, 2015

(54) PLANETARY GEAR SYSTEM

(75) Inventor: Heinz Hagedorn, Rottweil (DE)

(73) Assignee: IMS GEAR GMBH, Donaueschingen (DE)

( * ) Notice: Subject to any disclaimer, the term of this patent is extended or adjusted under 35 U.S.C. 154(b) by 0 days.

(21) Appl. No.: 14/003,430

(22) PCT Filed: May 10, 2012

(86) PCT No.: PCT/EP2012/002011
§ 371 (c)(1),
(2), (4) Date: Nov. 26, 2013

(87) PCT Pub. No.: WO2012/159711
PCT Pub. Date: Nov. 29, 2012

(65) Prior Publication Data
US 2014/0106926 A1    Apr. 17, 2014

(30) Foreign Application Priority Data
May 20, 2011    (DE) .......................... 10 2011 102 731

(51) Int. Cl.
*F16H 57/08*    (2006.01)

(52) U.S. Cl.
CPC ........ *F16H 57/082* (2013.01); *F16H 2057/085* (2013.01)

(58) Field of Classification Search
USPC .......................................... 475/346
See application file for complete search history.

(56) References Cited

U.S. PATENT DOCUMENTS

| | | | | |
|---|---|---|---|---|
| 4,988,329 A | * | 1/1991 | Lammers | 475/337 |
| 5,171,195 A | * | 12/1992 | Funamoto | 475/342 |
| 5,551,927 A | * | 9/1996 | Enzmann et al. | 475/265 |
| 6,106,429 A | * | 8/2000 | Mortensen | 475/331 |
| 2010/0304918 A1 | * | 12/2010 | Burgman et al. | 475/331 |

* cited by examiner

*Primary Examiner* — Ramya Burgess
*Assistant Examiner* — David Morris
(74) *Attorney, Agent, or Firm* — Juneau & Mitchell

(57) ABSTRACT

A planetary gear system having at least one planet carrier which comprises a planet carrier plate which is produced from plastic in one pieces together with at least one bearing pin for a planetary gear and which, on the output side, is rotationally fixed connected to a sun gear. According to the invention, a thrust collar that is connected to the planet carrier plate in one piece is provided between the planetary gear and the planet carrier plate of the planet carrier.

9 Claims, 1 Drawing Sheet

PLANETARY GEAR SYSTEM

CROSS REFERENCE TO RELATED APPLICATIONS

This patent application claims priority to International Patent Application PCT/EP2012/002011, filed on May 10, 2012, and thereby to German Patent Application 10 2011 102 731.2, filed on May 20, 2011.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The function of planetary gear systems is known per se. A sun gear or a sprocket is located at the drive side, which is driven by an engine connected via an engine flange to the planetary gear system. The sprocket transfers its motion to generally three traveling planet gears forming a gear speed, which are arranged on a bearing pin of a planet carrier, with at the drive side the planet carrier being connected in a torque-proof fashion to a sun gear combing the following gear speed with the planet gears of the planet carrier. In case of several gear speeds, the last planet carrier is connected fixed to a drive shaft and ensures this way for the force transmission at the drive side. On the outside, the planet gears travel in a transmission housing with internal teeth, the so-called hollow wheel. Further, the transmission housing is connected to a drive flange at the drive side.

2. Background of the Invention

The current state of knowledge is as follows.

A generic planetary gear system is known from DE 44 25 961 A1, with its planet carrier being produced in one piece as a plastic part comprising a planet carrier plate and the bearing pins rotationally accepting the planet gears. Here, polyamide is suggested as the plastic material. Additionally, according to this document, the planet gears are also produced from plastic.

Further, the bearing pins of this planet carrier of prior art according to DE 44 25 961 A1 are provided with a bead-like reinforcement at their connections at the planet carrier plate.

By such a reinforced embodiment of the planet carrier in the area of the connection of the bearing pin at the planet carrier plate, the torque stress can be increased without here a breakage occurring during operation of the planet carrier or the bearing pin. However, it is disadvantageous here that in the area of this bead-like reinforcement the planet gear placed thereon requires an area-fitting adjustment, resulting in additional expenses for the production of such a planet gear.

A planet gear is known from DE 10 2005 004 488 A1 in which a washer is arranged between a planet gear supported on the bearing pin and the planet carrier, comprising torque-proofing in the form of burling or studs, which engage corresponding recesses and/or elevations in the planet carrier. Such washers serve, on the one hand, to compensate axial forces of the planet gears, which for example develop by helical gearing of the planetary gear system and on the other hand damp oscillations as well as to ensure the supply of lubricant to bearings of the planet gears through recesses in the washers. In this planet gear system of prior art, the construction expense and the assembly expense are very high because on the one hand the production of such washers with burling or studs is expensive and additionally the planet carrier plate must show respective recesses and/or elevations and, on the other hand, the washers are required as additional parts to be assembled in the planetary gear system.

The objective of the invention is therefore to further develop a planetary gear system of the type mentioned at the outset such that the above-mentioned disadvantages are avoided, thus particularly a planetary gear system is provided, which can be produced and assembled in a cost-effective fashion.

BRIEF SUMMARY OF THE INVENTION

In a preferred embodiment, a planetary gear system with at least one planet carrier, which comprises a planet carrier plate produced in one piece together with at least one bearing pin for a planet gear, at the drive side connected in a torque-proof fashion to a sun gear, wherein a thrust collar is provided between the planet gear and the planet carrier plate of the planet carrier connected in one piece to the planet carrier plate.

In another preferred embodiment, planetary gear system of to claim as disclosed herein, further comprising wherein the thrust collar is embodied annularly.

In another preferred embodiment, planetary gear system of to claim as disclosed herein, further comprising wherein the planet carrier plate is embodied with a circumferential groove around the bearing pin, with the jacket surface of the bearing pin steadily transferring into the circumferential groove.

In another preferred embodiment, planetary gear system of to claim as disclosed herein, further comprising wherein the planet carrier plate is embodied with reinforcing ribs at the drive side.

In another preferred embodiment, planetary gear system of to claim as disclosed herein, further comprising wherein several reinforcing ribs are provided extending radially.

In another preferred embodiment, planetary gear system of to claim as disclosed herein, further comprising wherein the reinforcing ribs extend concentrically about the sun gear at the drive side.

In another preferred embodiment, planetary gear system of to claim as disclosed herein, further comprising wherein the planet carrier is produced as an injection molded part from a fiberglass reinforced plastic.

In another preferred embodiment, planetary gear system of to claim as disclosed herein, further comprising wherein at least one planet gear is produced from plastic, wherein the plastic is polyoxymethylene further comprising a filler.

In another preferred embodiment, planetary gear system of to claim as disclosed herein, wherein Teflon fibers (PTFE) are used as fillers for reinforcing the plastic.

In another preferred embodiment, a method of use of the planetary gear system as disclosed herein for a rear hatch drive of a motor vehicle.

DETAILED DESCRIPTION OF THE INVENTION

Figure 1:
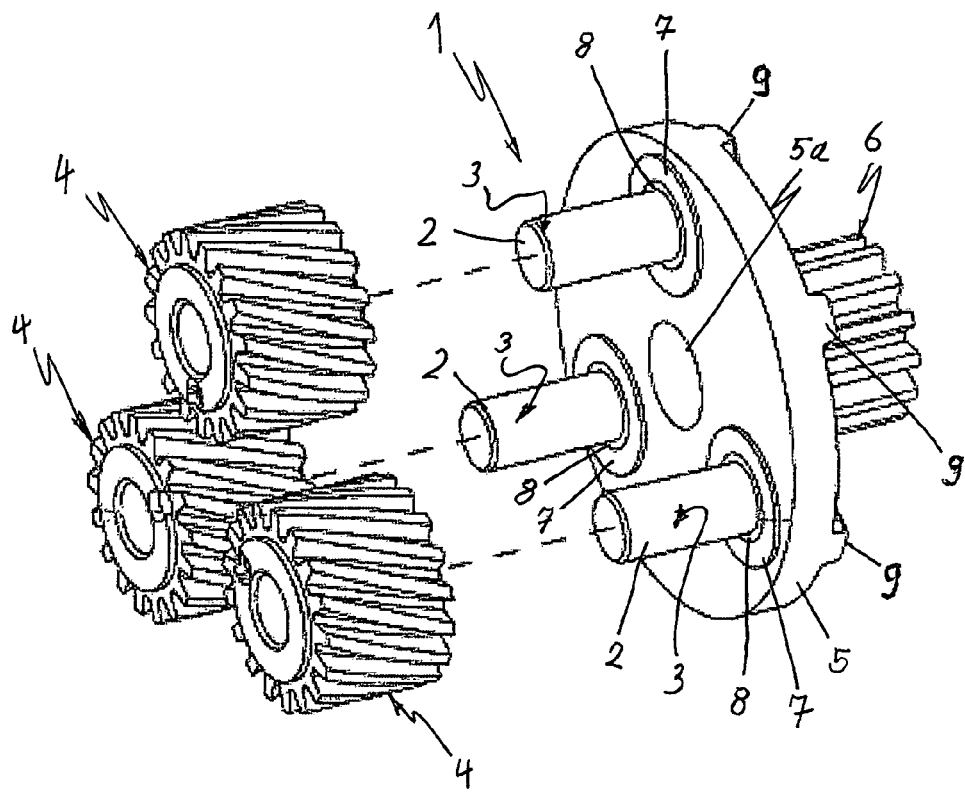
FIG. 1 is an exploded perspective line drawing of a planet carrier according to the invention with planet gears and a sun gear at the drive side in a view to the drive side.

The object of the invention is a planetary gear system with at least one planet carrier, which comprises a planet carrier plate produced in one piece from plastic together with at least one bearing pin for a planet gear, which is connected at the drive side with a sun gear in a torque-proof fashion, is characterized according to the invention such that between the planet gear and the planet carrier plate of the planet carrier a thrust collar is provided, connected in one piece with the planet carrier plate. Preferably this thrust collar is embodied with an annular shape.

Such a thrust collar performs the functions of a washer discussed at the outset, with both during the production of the planet carrier as well as during the assembly of the planetary gear system no additional expense arises. The thrust collars integrated in the planet carrier plate contribute to a better noise behavior of the planetary gear system, because any brushing of the teeth of the planet gears at the planet carrier plate is prevented. Overall, the planetary gear system with such a planet carrier according to the invention comprising a plastic material shows a better internal damping behavior due to the lower weight rotating.

In a beneficial embodiment of the invention the planet carrier plate is embodied with a groove around the bearing pin, with the jacket surface of the bearing pin steadily transferring into the circumferential groove.

This results in an improved supply of lubricant to bearings of the planetary gear system.

A further reduction of the moved weight is achieved according to a further development of the invention such that at the drive side the planet carrier plate is provided with reinforcing ribs. Preferably several reinforcing ribs can be arranged extending radially, with additional reinforcing ribs may be provided, which at the drive side extend concentrically about the sun gear.

It is particularly advantageous for the planetary gear system to be produced as an injection molded part from a fiberglass reinforced plastic, in order to this way yield sufficiently high strength.

With regards to a further improvement of the noise behavior of the planetary gear system it is advantageous to also produce at least one planet gear from polyoxy methylene (POM) being the plastic with a reinforcing filler, particularly Teflon fibers (PTFE).

The embodiment of the planetary gear system according to the invention is not limited to the use of a planet carrier with a single bearing pin and a planet gear resting thereon, but it has shown beneficial to embody the planet carrier with three bearing pins, respectively off-set in reference to each other by 120°, each of which carrying a planet gear and combing a hollow wheel. Additionally, the planetary gear system may also be embodied in several speeds with several such planet carriers.

The planetary gear system according to the invention is preferably applied for use for a rear hatch drive of a motor vehicle. Due to the fact that most of the parts provided for the gear system are made from plastic, such a rear hatch drive is characterized in low noise developing and a relatively low weight.

Detailed Description of the Figures

Figure 2:
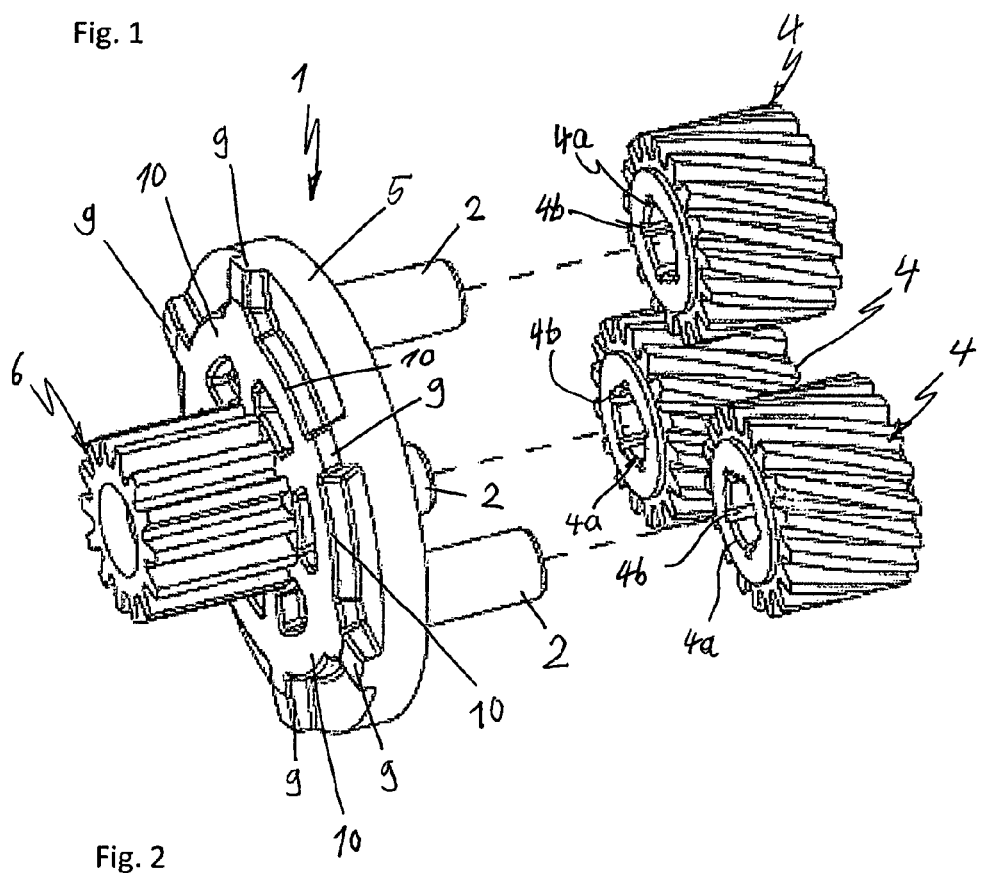
FIG. 2 is an exploded perspective line drawing of a planet carrier according to FIG. 1 in a view to the drive side.

Referring now to the figures, FIGS. 1 and 2 show a planet carrier 1 with planet gears 4 comprising at the drive side helical gearing and a sun gear 6 connected in a torque-proof fashion to the planet carrier 1 for a planetary gear system, with the corresponding drive sprocket as well as the corresponding hollow wheel, combed by the planet gears 4, not being shown. At the drive side the sun gear 6 combs planet gears of a planet carrier representing another gear speed, which is not shown either.

The planet carrier 1 is formed from a circular planet carrier plate 5 and three bearing pins 2, aligned perpendicular in reference to the planet carrier plate 5 and coaxial in reference to a central bore 5a, in one piece as an injection molded part comprising a plastic material, with a fiberglass reinforced plastic being used as said plastic material.

It is discernible from FIG. 1 that thrust collars 7, annularly around the bearing pins 2, are integrated in the planet carrier plate 5 such that any brushing is avoided of the gears of the planet gears 4, placed upon these bearing pins 2 against the planet carrier plate 5.

Further, FIG. 1 shows a groove 8 circumferential around the bearing pins 2, which is inserted in the planet carrier plate 5, so that the thrust collar 7 annularly circles this groove 8. This groove 8 may be embodied for example with an essentially semi-circular cross-section so that the bearing area 3 of the bearing pin 2 steadily transfers into said circumferential groove 8.

Due to the fact that the interior area of the bores 4a of the planet gears 4 shows axially extending grooves 4b, evenly distributed over the perimeter, together with the circumferential groove 8, an improved supply of lubricant is achieved to the bearings of the planet gears 4.

The planet gears 4 are produced by way of injection molding from plastic material, with polyoxy methylene (POM) reinforced with Teflon fibers being used as the plastic material.

The sun gear 6 is produced from metal and is impressed via press-fitting from the drive side of the planet carrier 1 into its bore 5a.

The view of the drive side of the planet carrier 1 according to FIG. 2 shows that the face of the planet carrier plate 5 at the drive side is embodied with reinforcing ribs 8 and 9.

Initially, starting from the central bore 5a, six evenly distributed reinforcing ribs 8 extend radially towards the outside to the edge of the planet carrier plate 5. Another reinforcing rib 9 annularly circles the sun gear 6.

LIST OF REFERENCE NUMBERS 1 planet carrier
2 bearing pin
3 bearing area of the bearing pin 2
4 planet gear
4a bore hole of the planet gear 4
4b groove at the inside of the bore hole 4a
5 planet carrier plate
6 sun gear
7 thrust collar
8 circumferential groove
9 reinforcing rib
10 reinforcing rib The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A planetary gear system with at least one planet carrier, which comprises a planet carrier plate having a first side with at least one bearing pin for a planet gear, and a second side as a drive side of the planet carrier plate having a sun gear connected in a torque-proof fashion, wherein a thrust collar annularly circles the at least one bearing pin and is connected to the second side of the planet carrier plate between the planet carrier plate and the planet gear, wherein the planet carrier plate, the at least one bearing pin, and the thrust collar are formed as a single piece.

2. The planetary gear system of claim 1, wherein the thrust collar is embodied annularly.

3. The planetary gear system of claim 1, wherein the planet carrier plate is embodied with a circumferential groove around the bearing pin, with a jacket surface of the bearing pin making a steady transmission into the circumferential groove.

4. The planetary gear system of claim 1, wherein the planet carrier plate is embodied with reinforcing ribs at the driven side.

5. The planetary gear system of claim 4, wherein several of the reinforcing ribs extend radially.

6. The planetary gear system of claim 4, wherein the reinforcing ribs extend concentrically about the sun gear at the driven side.

7. The planetary gear system of claim 1, wherein the planet carrier is produced as an injection molded part from a fiberglass reinforced plastic.

8. The planetary gear system of claim 1, wherein at least one planet gear is produced from plastic, wherein the plastic is polyoxymethylene further comprising a filler.

9. The planetary gear system of claim 8, wherein polytetrafluoroethylene fibers sold under the trademark Teflon™ fibers are used as fillers for reinforcing the plastic.

* * * * *